United States Patent [19]

Verhappen et al.

[11] 4,019,888

[45] Apr. 26, 1977

[54] METHOD OF MELTING A RAW BATH AND A GLASS FURNACE FOR PERFORMING THE METHOD

[75] Inventors: Paulus Jozef Maria Verhappen; Antonius Johannes Maria Van Tienen; Johannes Feenstra; Petrus Theodorus Cornelis Bastings, all of Eindhoven, Netherlands

[73] Assignee: U.S. Philips Corporation, New York, N.Y.

[22] Filed: Dec. 10, 1975

[21] Appl. No.: 639,577

[30] Foreign Application Priority Data

Feb. 10, 1975 Netherlands .............. 7501530

[52] U.S. Cl. .................... 65/135; 65/335; 65/345
[51] Int. Cl.² ..................... C03B 5/18
[58] Field of Search ........... 65/134, 135, 136, 337, 65/345, 347, 335

[56] References Cited

UNITED STATES PATENTS

| 3,248,205 | 4/1966 | Dolf et al. | 65/134 X |
|---|---|---|---|
| 3,929,445 | 12/1975 | Zippe | 65/335 |

*Primary Examiner*—Arthur D. Kellogg
*Attorney, Agent, or Firm*—Frank R. Trifari; David R. Treacy

[57] ABSTRACT

A method of and a glass furnace for the melting of a raw batch of glass, in the form of pellets distributed in a thin, uniform layer over a glass melt by a rotor arranged in the roof of the glass furnace, with air being injected into the glass melt. The melting process is accelerated and the homogeneity of the glass melt is improved.

4 Claims, 3 Drawing Figures

METHOD OF MELTING A RAW BATH AND A GLASS FURNACE FOR PERFORMING THE METHOD

BACKGROUND OF THE INVENTION

1. Field of the Invention

The invention relates to a method of melting a raw batch in a glass melt having a melting zone and a fining zone, the raw batch being continuously fed into the melting zone for the purpose of melting, and to a glass furnace comprising a melting tank with a melting compartment, the said melting tank communicating with a forehearth and being provided with firing means, and a charging device on the roof of the melting tank over the melting compartment.

2. Description of the Prior Art

A method of this kind is known from German Patent Specification No. 1,471,875, and U.S. Pat. No. 3,167,191 corresponding thereto. According to this known method, the raw batch is fed into the entrance of the melting zone and is melted in the melting zone and subsequently flows through the fining zone in the direction of a forehearth. In this known method there is a risk of accumulation, irregular melting and segregation of the raw batch. During the melting and fining process, convection currents are developed in the glass melt which are difficult to control, cause large temperature differences in the glass melt and hamper proper homogenizing of the glass melt.

German Patent Specification No. 1,596,446, and British Patent Specification No. 1,128,483 corresponding thereto, describes a method which aims to eliminate these drawbacks; however, for performing this method a special, cylindrical furnace construction including means which serve to create a circular flow in the glass melt are required.

From British Pat. Specification No. 1,032,298 it is known per se to apply a raw batch in the form of pellets; however, the pellets are fed via a funnel, so that no uniform distribution of the pellets over the melting zone can be achieved.

A furnace of this kind is known from the said German Patent Specification No. 1,596,446, in which the raw batch, however, is fed via a funnel in the roof of the melting tank, so that a uniform distribution of the raw batch over the surface of the glass melt and a fast and homogeneous melting of the raw batch cannot be obtained by means of this device.

SUMMARY OF THE INVENTION

An object of the invention is to provide a method which enables a very uniform temperature distribution to be realized in the glass melt and provides a simple, accelerated melting process.

According to the invention, this object is achieved by using a raw batch which comprises a controlled quantity of raw batch pellets or a mixture of pellitized raw glass and fragments, hereinafter described as prepared particles, uniformly distributing the raw batch over the surface of the melting zone in a layer having a thickness which substantially equals the thickness of the pellets (such a layer hereinafter referred to as a monolayer), and injecting a gas into the melting zone.

Glass melted using the method according to the invention is characterized by a particular homogenous quality as regards cord, internal stresses and the like.

The method was found to be particularly suitable for melting borosilicate glasses which have a high hardness and a low coefficient of thermal expansion and which can only be melted into an homogenous glass with difficulty in view of the high $SiO_2$ content.

In an apparatus according to the invention, the charging device comprises at last one rotor which is mounted in an opening in the roof of the melting tank and which is provided with at least one vane, and gas inlet tubes are located in the bottom of the melting tank at the area of the melting compartment. When the rotor rotates, the vane prevents the pellets from dopping perpendicularly downwards, a horizontal component being imparted to the movement of the pellets such that a scattering effect is achieved, without the granules being scattered away in an uncontrolled manner. Because the charging device is mounted on the roof of the melting tank, the opening which is usually present in one of the side walls of conventional melting tanks can be dispensed with. The number of rotors depends on the area to be covered and the dimensions of the melting tank. The distribution pattern of the pellets can be influenced by variation of the number of revolutions of the rotor.

A preferred embodiment of the glass furnace according to the invention is characterized by at least one vibratory hopper, the outlet of which discharge onto the rotor. With a vibratory hopper accurate control of the amount and steady flow of the raw batch is ensured.

The glass furnace according to the invention has a capacity which is higher than that of a conventional glass furnace of the same dimensions; on the other hand, for the same capacity, a glass furnace according to the invention can be constructed to be shorter than a conventional glass furnace.

BRIEF DESCRIPTION OF THE DRAWING

The invention will be described in detail hereinafter with reference to the drawing in which.

DESCRIPTION OF THE PREFERRED EMBODIMENTS

Figure 1:
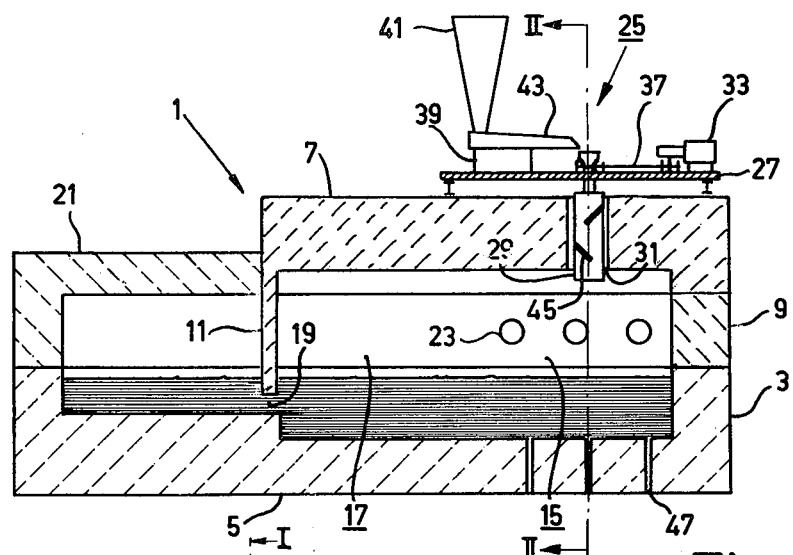
FIG. 1 is a longitudinal sectional view of a glass furnace according to the invention, taken along the line I—I of FIG. 2.
Figure 2:
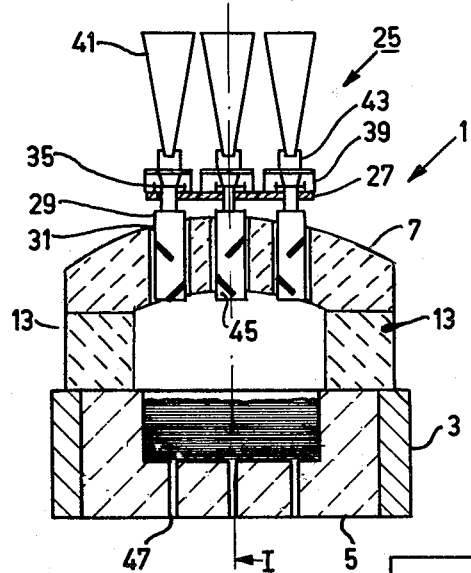
FIG. 2 is a cross-sectional view of the glass furnace taken along the line II—II of FIG. 1.
Figure 3:
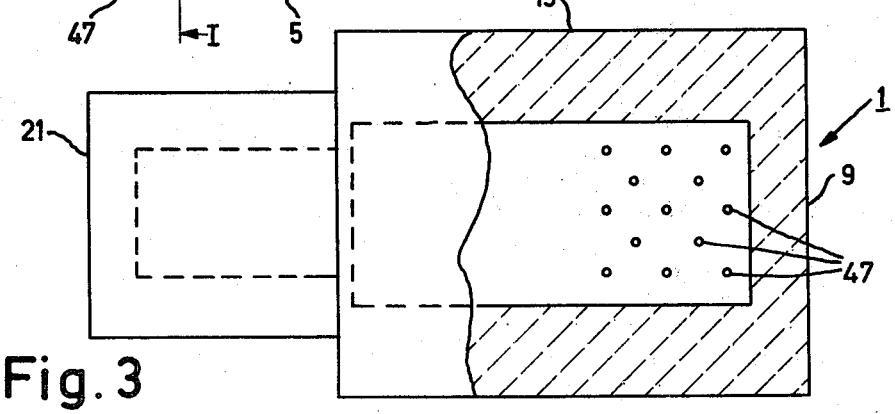
FIG. 3 is a partial plan view and a partial sectional view of the glass furnace.

A glass furnace 1 comprises a melting tank 3 with a bottom 5, a roof 7, a rear wall 9, a front wall 11 and side walls 13. The melting tank 3 has a melting compartment 15 and a fining compartment 17. Via a passage duce 19 in the front wall 11, the melting tank 3 communicates with a forehearth 21. Burners 23 are mounted in the side walls. On the roof 7 a charging device 25 is mounted, consisting of a support plate 27 wherefrom three tubular rotors 29 are suspended to be rotatable. The rotors 29 project through openings 31 in the roof 7. Each rotor is driven at controlled speed by an electric motor 33 by way of pulleys or chain wheels 35 and a belt or chain 37. On the support plate 27 there are also arranged three vibratory hoppers 39, each of which comprises a filling funnel 41 and a discharge chute 43. Each rotor is continuously supplied with pellets at a controlled rate by one of the vibratory hoppers for distributing a uniform monolayer over the surface of the melting zone. Each rotor comprises one or more distributing vanes 45 which are arranged at an angle of eccentrically. Tubes 47 for injecting air or oxygen are provided in the bottom 5 of the melting tank 3.

In the embodiment shown, each rotor cooperates with a separate vibratory hopper; the raw batch of prepared particles may consist of raw batch pellets only or of a mixture of raw batch pellets and glass fragments. If desired, the glass fragments can be dosed by way of separate vibratory hoppers, a pair of vibratory hoppers cooperating with one rotor, one hopper of each pair discharging a flow of raw batch pellets, the other hopper discharging a flow of glass fragments.

The melting of the pellets is accompanied by development of gas, so that a foam collar is formed around each pellet. These foam collars are combined to form a foam blanket which has an insulting effect on the melting zone. By injecting a gas, for example, air or oxygen into the melting zone (so-called bubbling) in a known manner, this foam blanket is continuously punctured and molten glass is forced to surface of the melting zone. As a result, there is always intensive mixing of discrete molten pellet particles and already molten glass. This is a contrast with the conventional method, where the risk of de-mixing of the raw batch exists because of the injection of air bubbles. A pelletized raw batch offers the additional advantage that it does not dust, so that the application rate of the raw batch can be controlled and distributed in a uniform and thin layer over the surface of the melting zone in a controlled manner; because the raw batch is deposited in a thin layer, the melting time is further reduced. It is a further advantage of pellets that they have a comparatively high heat conductivity, because the density of the raw batch is increased by pelletizing.

All these factors promote fast and homogeneous melting of the raw batch and proper temperature control of the glass melt. Tests have revealed that the maximum temperature differences existing within the glass melt remain limited to approximately 10° C at a mean temperature of glass melt of 1400° C. It is to be noted that when the conventional melting method is used, temperature differences of up to 100° C may occur. It was also found that under given circumstances the melting time can be reduced by 50%.

What is claimed is:

1. A method of melting a raw batch in a glass melt having a melting zone and a fining zone, the raw batch being continuously fed into the melting zone for melting, comprising the steps of supplying heat to the melting zone, supplying raw batch in the form of prepared particles at a controlled rate, uniformly scattering said particles in a layer over the surface of molten glass in the melting zone, controlling the rate of supplying said raw batch and said heat so that said layer is a monolayer, and injecting a gas into the molten glass below said layer at a rate sufficient to puncture any foam blanket tending to form on the molten glass.

2. A method as claimed in claim 1, wherein said supplying step comprises mixing a flow of raw batch pellets and a flow of glass fragments.

3. An apparatus for melting and fining glass, comprising a melting tank having a melting compartment having a roof thereover and a bottom, a fining compartment, means for firing the tank, means for communicating with a forehearth, and a charging device mounted over the melting compartment, wherein said roof has an opening, and said charging device comprises a rotor having distributing vanes mounted in said roof opening at a height remote from the surface of the melt and adapted for spreading prepared particles in a single layer over the surface of the melt, and said melting compartment comprises a gas inlet tube in said bottom.

4. An apparatus as claimed in claim 3, wherein said charging device comprises at least one vibratory hopper having an outlet, the outlet of said hopper discharging onto the rotor.

* * * * *